Oct. 1, 1968  R. L. LEWIS  3,403,517
VORTEX VALVE CONTROL FOR MASTER CYLINDER
Filed Sept. 12, 1966
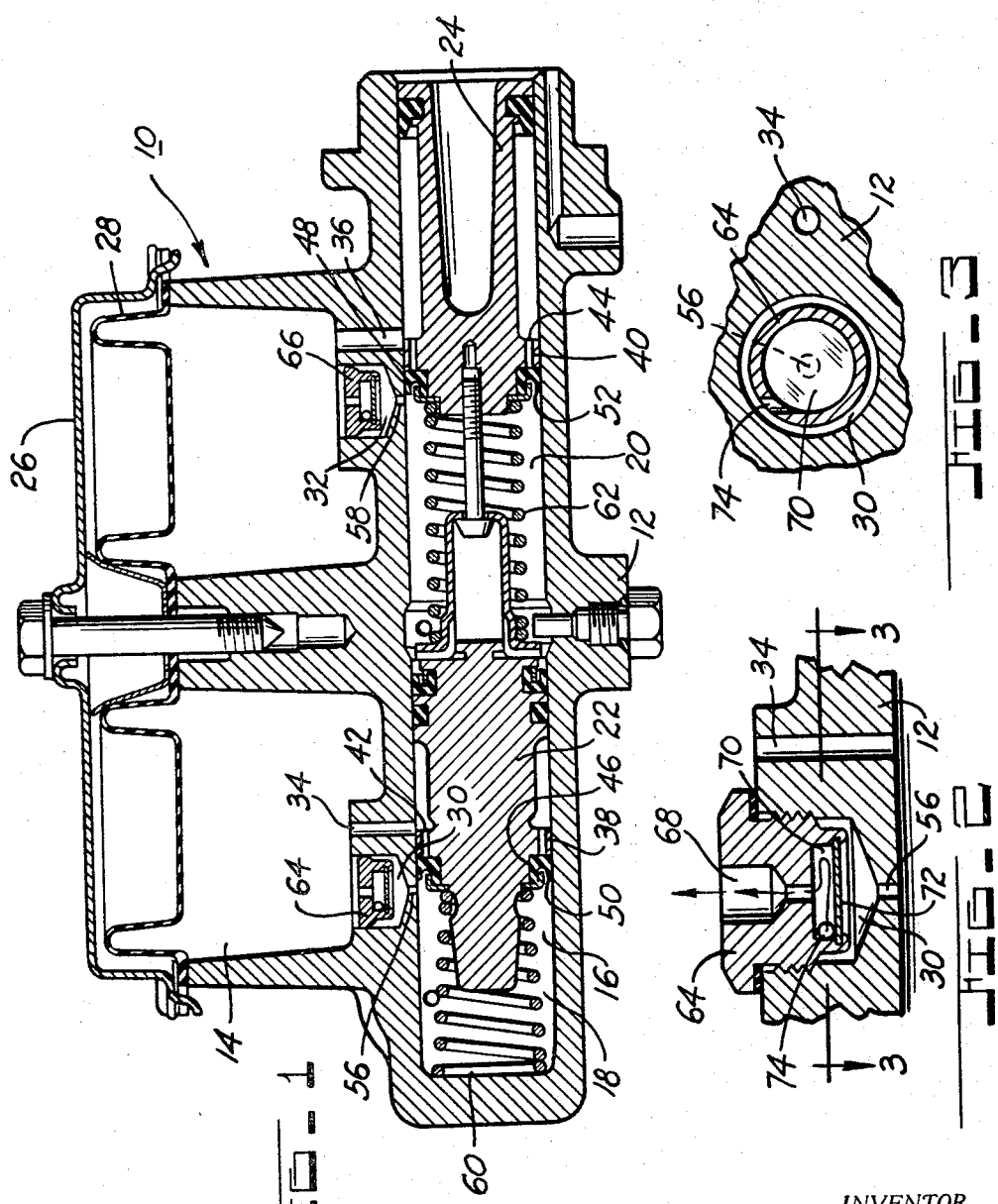
INVENTOR.
RICHARD L. LEWIS.
BY
*Richard A. Seib*
ATTORNEY.

3,403,517
VORTEX VALVE CONTROL FOR
MASTER CYLINDER
Richard L. Lewis, St. Joseph, Mich., assignor to The
Bendix Corporation, a corporation of Delaware
Filed Sept. 12, 1966, Ser. No. 578,671
4 Claims. (Cl. 60—54.6)

This invention relates to a vortex valve for limiting the pressure differential between a compensator passage and a master cylinder pressurizing chamber during the actuation of the master cylinder.

As may be appreciated by those skilled in the art most master cylinders of today have fluid compensating passages that are controlled by the lip of a cup seal for the master cylinder piston. It has been experienced that the actuation of the master cylinder piston will create a pressure differential passage that will cause extrusion of the lip of the cup seal which will scar the lip and eventually cause the seal to fail.

It is a primary object of this invention, therefore, to prevent a pressure differential from arising in the compensator passage and thereby correct the above problem.

It is another, more detailed object of this invention to provide a vortex valve within the compensator passage that will provide unrestricted compensating flow but which will equalize the pressure in the compensating passage with that of the master cylinder pressurizing chamber during the actuation of the piston.

Other and more detailed objects of this invention will become apparent from a description of the following drawings in which:

FIGURE 1 is a cross sectional showing of a master cylinder embodying a vortex valve in accordance with the principles of this invention; and FIGURES 2 and 3 are enlarged cross sectional details of a vortex valve in accordance with the principles of this invention.

Referring now to FIGURE 1 there is shown a split-system type master cylinder 10 having a housing 12 formed with a fluid reservoir 14 and a cylinder bore 16. The reservoir is of a type to provide separate chambers for compensating the fluid volume in the independent variable volume chambers 18 and 20 created in the cylinder bore 16 by the pistons 22 and 24. The reservoir is closed by means of a cap 26 having a diaphragm seal 28.

The independent reservoirs are each provided with fluid return passages 30 and 32 and compensating fluid passages 34 and 36. The fluid from the compensating ports 34 and 36 is communicated to chambers 18 and 20 and to the portion of the bore 16 behind the faces 38 and 40 of the respective pistons 22 and 24 to provide for compensation of fluid which may be lost in a brake pressure system. With more particular regard to the flow path of fluid for compensating losses it enters by means of piston passages 42 and 44 to the area immediately behind a pair of cup seals 46 and 48 to flow around their respective lips 50 and 52 into the pressurizing chambers 18 and 20.

The return flow passages 30 and 32 are open to the respective chambers 18 and 20 by drilled passages 56 and 58 located centrally of the return ports 30 and 32. The drilled passages 56 and 58 are arranged to be located immediately ahead of the lips 50 and 52 of the sealing cups 46 and 48, respectively, when the pistons 22 and 24 are in their released attitude as maintained by springs 60 and 62. Within the bores 30 and 32 fittings 64 and 66 are sealingly assembled.

With regard now to FIGURE 2, and with reference to the construction of fittings 64 and 66, these fittings are provided each with an axial passage 68 that opens into a vortex chamber 70 that is closed by a flat washer 72 at the lower extremity of the fitting 64. The vortex chamber has a radial outlet 74 located on its peripheral portion to communicate the vortex chamber 70 to the bore 30 and to the passage 56.

Therefore, upon actuation of the pistons 22 and 24, that are operatively connected by a cage spring arrangement familiar to those skilled in the art, the lips 50 and 52 along with the faces 38 and 40 of the pistons 22 and 24 reduce the volume in the pressurizing chambers 18 and 20 to increase the pressure therein. This pressure, until the lips 50 and 52 close off the passages 56 and 58, is also directed to the bores 30 and 32. However, upon entering the bores 30 and 32 by way of the passages 56 and 58, the pressure is introduced to the tangential radial passage 74 to the vortex chamber 70 to create a swirling action of the fluid within the vortex chamber. This has the effect of restricting the axial passage 68 so that the pressures within the passages 56 and 58 are equalized with respect to the pressures in the chambers 18 and 20 which will prevent extrusion of lips 50 and 52 into these passages.

Having described a manner of construction for this invention, it is not intended that the scope of the Letters Patent be limited to this description, as other embodiments are well within the skill of the art in view of the teachings of this specification and drawings. It is, rather, intended that the scope of the Letters Patent be defined by the following claims.

I claim:
1. A master cylinder comprising:
 a housing having a cylinder bore and a reservoir chamber;
 passage means communicating said bore and said chamber;
 a movable wall operably arranged in said bore having means to regulate the communication of said bore in said reservoir; and
 a vortex restrictor in said passage means wherein said vorter restrictor is characterized as a fitting affixed within said passage means, said fitting having an axial passage leading from said passage means on the reservoir side to a vortex chamber in said fitting and a peripherally located radial passage leading from said vortex chamber back to said passage means opening to said cylinder bore so that unrestricted flow is permitted from said reservoir to said cylinder bore through said fitting and return pressure flow from said bore will create a vortex in said vortex chamber to restrict the axial passage to restrict the return pressure flow by creating a pressure differential between said bore and reservoir.

2. A master cylinder according to claim 1 wherein said fitting includes a first housing portion having an axial passage, a second housing portion having a chamber with a peripherally located radial passage.

3. A master cylinder according to claim 2 wherein said second portion is a counterbore in said first portion with a flat washer affixed to its open end to create said chamber.

4. A master cylinder comprising:
 a housing including a fluid reservoir, a cylinder bore and fluid return bore means between said reservoir and cylinder bore;
 piston means operatively arranged in said cylinder bore;
 cup seal means operatively connected to said piston to form a variable volume chamber ahead of said piston means, said cup seal means having lip means normally positioned immediately behind said return bore means and slidable thereacross for sealing said variable volume chamber during the pressurization of fluid therewithin by said piston means; and one way restrictor means in said return bore means having a fitting with an axial passage communicating said reservoir to a vortex chamber at substantially the center of said vortex chamber and a radial passage open to said vortex chamber at the peripheral surface along an axis tangential with said surface to thereby communicate said vortex chamber to said variable volume chamber.

References Cited

UNITED STATES PATENTS

| 2,444,043 | 6/1948 | Hawley | 60—54.6 |
| 3,199,299 | 8/1965 | Moyer | 60—54.6 |

MARTIN P. SCHWADRON, *Primary Examiner.*

ROBERT R. BUNEVICH, *Assistant Examiner.*